(12) United States Patent
Sirotkin

(10) Patent No.: US 10,397,830 B2
(45) Date of Patent: \*Aug. 27, 2019

(54) METHOD, SYSTEM AND APPARATUS OF WIRELESS LOCAL AREA NETWORK (WLAN) COMMUNICATION IN CONJUNCTION WITH CELLULAR COMMUNICATION

(71) Applicant: INTEL CORPORATION, Santa Clara, CA (US)

(72) Inventor: Alexander Sirotkin, Giv'on Hachadasha (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/846,581

(22) Filed: Dec. 19, 2017

(65) Prior Publication Data
US 2018/0192326 A1 Jul. 5, 2018

Related U.S. Application Data

(63) Continuation of application No. 14/583,143, filed on Dec. 25, 2014, now Pat. No. 9,883,421, which is a
(Continued)

(51) Int. Cl.
*H04W 28/08* (2009.01)
*H04W 28/02* (2009.01)
(Continued)

(52) U.S. Cl.
CPC ........... *H04W 28/08* (2013.01); *H04W 24/10* (2013.01); *H04W 28/0205* (2013.01);
(Continued)

(58) Field of Classification Search
None
See application file for complete search history.

(56) References Cited

U.S. PATENT DOCUMENTS 9,055,514 B2 * 6/2015 Meylan ................ H04W 48/10
9,883,421 B2 * 1/2018 Sirotkin ............ H04W 28/0247
(Continued)

FOREIGN PATENT DOCUMENTS

EP     1411670     4/2004
WO    2010002692    1/2010
(Continued)

OTHER PUBLICATIONS

Office Action for Chinese Patent Application No. 201380024459.9, dated Jul. 24, 2018, 4 pages.
(Continued)

*Primary Examiner* — Anh Ngoc M Nguyen
(74) *Attorney, Agent, or Firm* — Shichrur & Co.

(57) ABSTRACT

Some demonstrative embodiments include devices, systems and/or methods of Wireless-Local-Area-Network (WLAN) communication in conjunction with cellular communication. For example, an apparatus may include a wireless communication unit to receive WLAN load information indicating a load of at least one WLAN controlled by at least one access point (AP), and, based on the WLAN load information, to select between connecting to the AP and connecting to a cellular node.

23 Claims, 5 Drawing Sheets

Related U.S. Application Data continuation of application No. 13/681,541, filed on Nov. 20, 2012, now Pat. No. 8,988,999.

(60) Provisional application No. 61/653,369, filed on May 30, 2012, provisional application No. 61/679,627, filed on Aug. 3, 2012.

(51) Int. Cl.
  *H04W 48/06* (2009.01)
  *H04W 24/10* (2009.01)
  *H04W 48/18* (2009.01)

(52) U.S. Cl.
  CPC ....... *H04W 28/0247* (2013.01); *H04W 48/06* (2013.01); *H04W 48/18* (2013.01); *Y02B 70/1483* (2013.01)

(56) References Cited

U.S. PATENT DOCUMENTS

| | | | |
|---|---|---|---|
| 2004/0039817 A1* | 2/2004 | Lee | H04W 24/00 709/225 |
| 2006/0174288 A1 | 8/2006 | Bichot et al. | |
| 2007/0153802 A1* | 7/2007 | Anke | H04L 47/10 370/395.42 |
| 2011/0222523 A1* | 9/2011 | Fu | H04W 36/22 370/338 |
| 2012/0307808 A1 | 12/2012 | Song et al. | |
| 2013/0021962 A1 | 1/2013 | Hu et al. | |
| 2013/0034090 A1* | 2/2013 | Thomas | H04W 48/04 370/338 |
| 2013/0121145 A1* | 5/2013 | Draznin | H04L 12/5692 370/230 |
| 2013/0163463 A1* | 6/2013 | Grayson | H04L 43/0876 370/253 |
| 2013/0322238 A1 | 12/2013 | Sirotkin | |
| 2014/0050086 A1 | 2/2014 | Himayat et al. | |

FOREIGN PATENT DOCUMENTS

| | | |
|---|---|---|
| WO | 2010078589 | 7/2010 |
| WO | 2011088068 | 7/2011 |

OTHER PUBLICATIONS

International Search Report and Written Opinion for International Patent Application No. PCT/US2013/041195, dated Jul. 29, 2013, 14 pages.
Sueng Jae Bae et al., "Handover Triggering Mechanism Based on IEEE 802.21 in Heterogeneous Networks with LTE and WLAN", ICOIN 2011, 6 pages.
Hector Velayos et al., "Load Balancing in Overlapping Wireless LAN Cells", IEEE 2004, IEEE Communications Society, 5 pages.
IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
3GPP TS 23.402 V11.2.0 (Mar. 2012); 3rd Generation Partnership Project; Technical Specification Group Services and System Aspects; Architecture enhancements for non-3GPP accesses (Release 11); Mar. 2012; 251 pages.
3GPP TS 36.331 V10.5.0 (Mar. 2012); 3rd Generation Partnership Project; Technical Specification Group Radio Access Network; Evolved Universal Terrestrial Radio Access (E-UTRA); Radio Resource Control (RRC); Protocol specification (Release 10); Mar. 2012; 302 pages.
International Preliminary Report on Patentability for International Patent Application No. PCT/US2013/041195, dated Dec. 11, 2014, 10 pages.
Office Action for U.S. Appl. No. 13/681,541, dated Jun. 4, 2014, 24 pages.
Search Report for European Patent Application No. 13797365.7 dated Mar. 30, 2016, 9 pages.
Office Action for U.S. Appl. No. 14/583,143, dated Feb. 2, 2017, 25 pages.
Office Action for U.S. Appl. No. 14/583,143, dated Jul. 5, 2017, 6 pages.
Notice of Allowance for U.S. Appl. No. 14/583,143, dated Sep. 14, 2017 5 pages.
Office Action for Chinese Patent Application No. 201380024459.9, dated Jul. 10, 2017, 3 pages.
English translation, received on Sep. 11, 2017, of the Jul. 10, 2017 Office Action for Chinese Patent Application No. 201380024459.9, 5 pages.
English translation, received on Aug. 27, 2018, of the Jul. 24, 2018 Office Action for Chinese Patent Application No. 201380024459.9, 5 pages.
Office Action for Chinese Patent Application No. 201380024459.9, dated Feb. 6, 2018, 8 pages (Including 5 pages of English translation).
English translation, received on Apr. 9, 2019, of the Mar. 6, 2019 Office Action for Chinese Patent Application No. 201380024459.9, 4 pages.

* cited by examiner

METHOD, SYSTEM AND APPARATUS OF WIRELESS LOCAL AREA NETWORK (WLAN) COMMUNICATION IN CONJUNCTION WITH CELLULAR COMMUNICATION

CROSS REFERENCE

This Application is a Continuation Application of U.S. patent application Ser. No. 13/681,541, filed on Nov. 20, 2012, which claims the benefit of and priority from U.S. Provisional Patent Application No. 61/653,369 entitled "Advanced Wireless Communication Systems and Techniques", filed May 30, 2012, and U.S. Provisional Patent Application No. 61/679,627 entitled "Advanced Wireless Communication Systems and Techniques", filed Aug. 3, 2012, the entire disclosures of all of which are incorporated herein by reference.

BACKGROUND

A wireless communication device, e.g., a mobile device, may be configured to utilize multiple wireless communication technologies.

For example, a User Equipment (UE) device may be configured to utilize a cellular connection, e.g., a Long Term Evolution (LTE) cellular connection, as well as a wireless-local-area-network (WLAN) connection, e.g., a Wireless-Fidelity (WiFi) connection.

The UE may be configured to automatically utilize a WiFi connection, for example, as long as a Wi-Fi signal received by the UE is strong enough.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
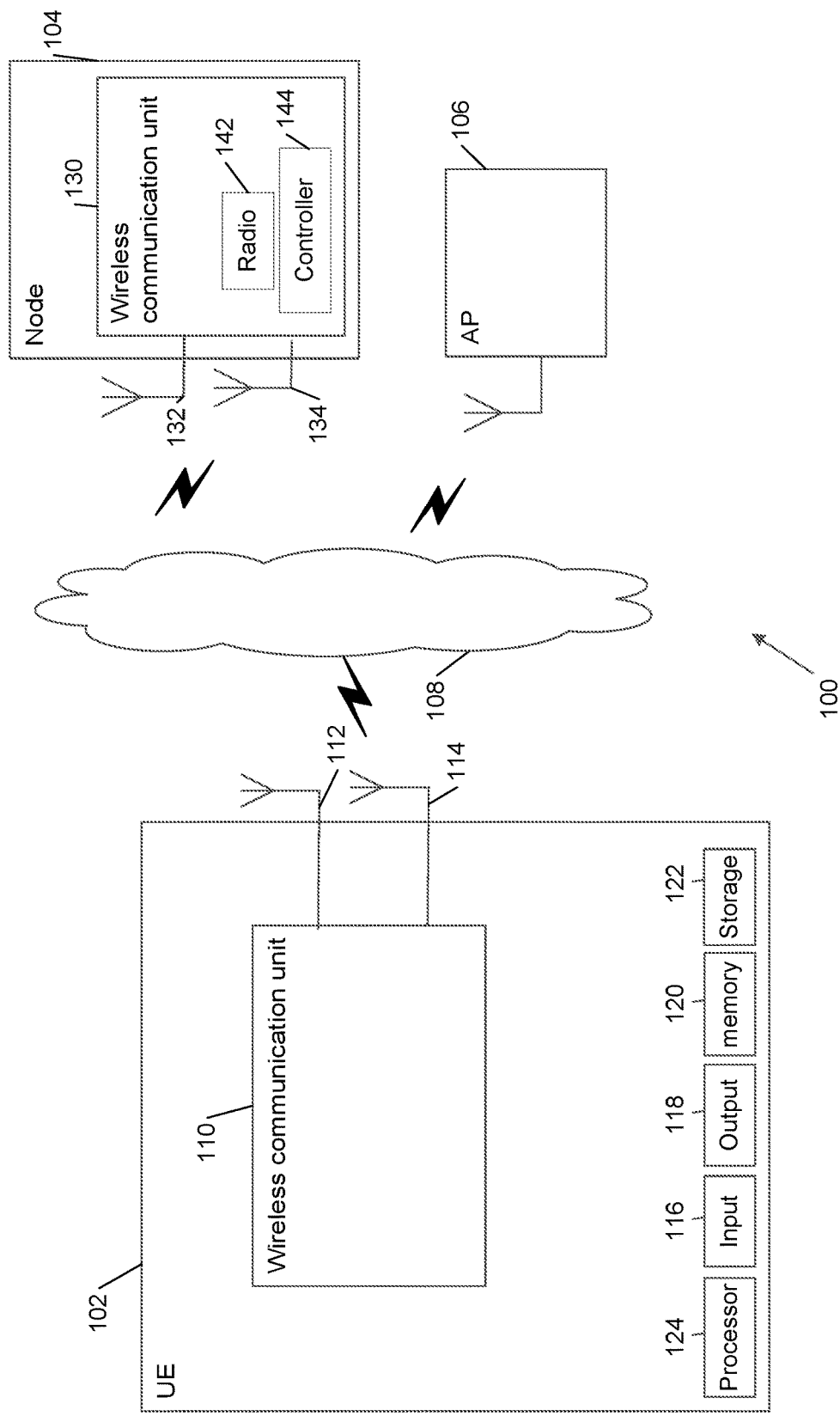
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication device, a wireless communication station, a wireless communication device, a wireless Access Point (AP), a wired or wireless router, a wired or wireless modem, a video device, an audio device, an audio-video (A/V) device, a wired or wireless network, a wireless area network, a cellular network, a cellular node, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing Long Term Evolution (LTE) specifications (including "*RAN2 RRC—3GPP TS 36.331: Evolved Universal Terrestrial Radio Access (E-UTRA); Radio Resource Control (RRC); Protocol specification*"; and "RAN3 X2—3GPP TS 36.423: Evolved Universal Terrestrial Radio Access Network (E-UTRAN); X2 Application Protocol (X2AP)") and/ or future versions and/or derivatives thereof, devices and/or networks operating in accordance with existing Wireless-Gigabit-Alliance (WGA) specifications (*Wireless Gigabit Alliance, Inc WiGig MAC and PHY Specification Version 1.0, April* 2010, *Final specification*) and/or future versions and/or derivatives thereof, devices and/or networks operating in accordance with existing IEEE 802.11 standards (*IEEE 802.11-2007, IEEE Standard for Information Technology—Telecommunications and information exchange between systems—Local and metropolitan area networks—Specific requirements, Part* 11: *Wireless LAN Medium Access Control* (*MAC*) *and Physical Layer* (*PHY*) *Specifications*), and/or future versions and/or derivatives thereof, devices and/or networks operating in accordance with existing IEEE 802.16 standards (*IEEE-Std* 802.16, 2009 *Edition, Air Interface for Fixed Broadband Wireless Access Systems; IEEE-Std* 802.16e, 2005 *Edition, Physical and Medium Access Control Layers for Combined Fixed and Mobile Operation in Licensed Bands; amendment to IEEE Std* 802.16-2009, *developed by Task Group m*) and/or future versions and/or derivatives thereof, devices and/or networks operating in accordance with existing Wireless-WirelessHD™ specifications and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments are described herein with respect to a LTE cellular system. However, other embodiments may be implemented in any other suitable cellular network, e.g., a 3G cellular network, a 4G cellular network, a WiMax cellular network, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node (also referred to as a "base station"), or the like. The linking between a carrier frequency of the downlink resources and a carrier frequency of the uplink resources may be indicated in system information transmitted on the downlink resources.

The phrase "access point" (AP), as used herein, may include an entity that includes a station (STA) and provides access to distribution services, via the Wireless Medium (WM) for associated STAs.

The term "station" (STA), as used herein, may include any logical entity that is a singly addressable instance of a medium access control (MAC) and a physical layer (PHY) interface to the WM.

The phrases "directional multi-gigabit (DMG)" and "directional band" (DBand), as used herein, may relate to a frequency band wherein the Channel starting frequency is above 56 GHz.

The phrases "DMG STA" and "mmWave STA (mSTA)" may relate to a STA having a radio transmitter, which is operating on a channel that is within the DMG band.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via one or more wireless mediums 108. For example, system 100 may include at least one User Equipment (UE) 102, at least one cellular node 104 (also referred to as a "base station"), and at least one WLAN AP 106.

Wireless mediums 108 may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, UE 102, cellular node 104 and/or AP 106 may form and/or communicate as part of one or more wireless communication networks.

For example, node 104 and UE 102 may form and/or may communicate as part of a cellular network, e.g., a cell; and/or AP 106 and UE 102 may form and/or may communicate as part of a WLAN, e.g., a Basic Service Set (BSS).

In some demonstrative embodiments, node 104 may include an Evolved Node B (eNB). For example, node 104 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or an Evolved Packet Core (EPC), scheduling and/or transmitting paging messages, e.g., incoming calls and/or connection requests, broadcast information coordination, measurement reporting, and/or any other operations.

In other embodiments, node 104 may include any other functionality and/or may perform the functionality of any other cellular node, e.g., a Node B (NB).

In some demonstrative embodiments, UE 102 may include, for example, a mobile computer, a laptop computer, a notebook computer, a tablet computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, UE 102, node 104 and/or AP 106 may include one or more wireless communication units to perform wireless communication between UE 102, node 104, AP 106 and/or with one or more other wireless communication devices, e.g., as described below. For example, UE 102 may include a wireless communication unit 110 and/or node 104 may include a wireless communication unit 130.

In some demonstrative embodiments, wireless communication units 110 and 130 may include, or may be associated with, one or more antennas. In one example, wireless communication unit 110 may be associated with at least two antennas, e.g., antennas 112 and 114; and/or wireless communication unit 130 may be associated with at least two antennas, e.g., antennas 132 and 134.

In some demonstrative embodiments, antennas 112, 114, 132 and/or 134 may include any type of antennas suitable for transmitting and/or receiving wireless communication signals, blocks, frames, transmission streams, packets, messages and/or data. For example, antennas 112, 114, 132 and/or 134 may include any suitable configuration, structure and/or arrangement of one or more antenna elements, components, units, assemblies and/or arrays. For example, antennas 112, 114, 132 and/or 134 may include a phased array antenna, a dipole antenna, a single element antenna, a set of switched beam antennas, and/or the like.

In some embodiments, antennas 112, 114, 132 and/or 134 may implement transmit and receive functionalities using separate transmit and receive antenna elements. In some embodiments, antennas 112, 114, 132 and/or 134 may implement transmit and receive functionalities using common and/or integrated transmit/receive elements.

In some demonstrative embodiments, wireless communication units 110 and/or 130 include, for example, at least one radio 134 and/or at least one controller 144 to control communications performed by radio 134. For example, radio 134 may include one or more wireless transmitters, receivers and/or transceivers able to send and/or receive wireless communication signals, RF signals, frames, blocks, transmission streams, packets, messages, data items, and/or data.

In some demonstrative embodiments, radio 134 may include a multiple input multiple output (MIMO) transmitters receivers system (not shown), which may be capable of performing antenna beamforming methods, if desired.

In some demonstrative embodiments, radio 134 may include a turbo decoder and/or a turbo encoder (not shown) for encoding and/or decoding data bits into data symbols, if desired.

In some demonstrative embodiments, radio 134 may include OFDM and/or SC-FDMA modulators and/or demodulators (not shown) configured to communicate OFDM signals over downlink channels, e.g., between node 104 and UE 102, and SC-FDMA signals over uplink channels, e.g., between UE 102 and node 104.

In some demonstrative embodiments, wireless communication unit 110 may establish a WLAN link with AP 106. For example, wireless communication unit 110 may perform the functionality of one or more STAs, e.g., one or more DMG STAs. The WLAN link may include an uplink and/or a downlink. The WLAN downlink may include, for example, a unidirectional link from AP 106 to the one or more STAs or a unidirectional link from a Destination STA to a Source STA. The uplink may include, for example, a unidirectional link from a STA to AP 106 or a unidirectional link from the Source STA to the Destination STA.

In some demonstrative embodiments, UE 102, node 104 and/or AP 106 may also include, for example, one or more of a processor 124, an input unit 116, an output unit 118, a memory unit 120, and a storage unit 122. UE 102, node 104 and/or AP 106 may optionally include other suitable hardware components and/or software components. In some demonstrative embodiments, some or all of the components of one or more of UE 102, node 104 and/or AP 106 may be enclosed in a common housing or packaging, and may be interconnected or operably associated using one or more wired or wireless links. In other embodiments, components of one or more of UE 102, node 104 and/or AP 106 may be distributed among multiple or separate devices.

Processor 124 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 124 executes instructions, for example, of an Operating System (OS) of UE 102, node 104 and/or AP 106 and/or of one or more suitable applications.

Input unit 116 includes, for example, a keyboard, a keypad, a mouse, a touch-screen, a touch-pad, a track-ball, a stylus, a microphone, or other suitable pointing device or input device. Output unit 118 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 120 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 122 includes, for example, a hard disk drive, a floppy disk drive, a Compact Disk (CD) drive, a CD-ROM drive, a DVD drive, or other suitable removable or non-removable storage units. Memory unit 120 and/or storage unit 122, for example, may store data processed by UE 102, node 104 and/or AP 106.

In some demonstrative embodiments, UE 102 may be configured utilize a cellular connection, e.g., a Long Term Evolution (LTE) cellular connection, to communicate with node 104, and a WLAN connection, e.g., a Wireless-Fidelity (WiFi) connection, to communicate with AP 106.

In some demonstrative embodiments, utilizing the WLAN connection as a default connection, e.g., as long as UE 102 receives from AP 106 a strong enough signal, may result in an increase in the congestion of the WLAN, e.g., if a large number of UEs connect by default to the same AP, which in turn may result in a decrease of throughput over the WLAN connection between UE 102 and AP 106.

In some demonstrative embodiments, UE 102, node 104 and/or AP 106 may be configured to enable selective connection of UE 102 to the WLAN or the cellular network, for example, based on a load of the WLAN and/or a load of the cellular network, e.g., as described in detail below.

In some demonstrative embodiments, the selective connection between UE 102 and node 104 or AP 106 may enable, for example, load balancing between the WLAN and the cellular network.

In some demonstrative embodiments, node 104 may be configured to transmit one or more messages including load information, which may include WLAN load information of the WLAN controlled by AP 106 and/or cellular load information of the cell controlled by node 104, e.g., as described in detail below.

The phrase "load information" as used herein with respect to a communication network may relate to any one or more parameters, values, attributes and/or other data indicating, representing, defining and/or relating to a load, an access network load, a backhaul load, a level of congestion, a capacity level, an available capacity, a free capacity, a usage level, a ratio between used capacity and available capacity, and/or an available bandwidth of the communication network.

For example, the phrase "WLAN load information" as used herein with respect to a WLAN may relate to any one or more parameters, values, attributes and/or other data indicating, representing, defining and/or relating to a load, an access network load, a backhaul load, a level of congestion, a capacity level, an available capacity, a free capacity, a usage level, a ratio between used capacity and available capacity, and/or an available bandwidth of the WLAN.

For example, the phrase "cellular load information" as used herein with respect to a cell may relate to any one or more parameters, values, attributes and/or other data indicating, representing, defining and/or relating to a load, an access network load, a backhaul load, a level of congestion, a capacity level, an available capacity, a free capacity, a usage level, a ratio between used capacity and available capacity, and/or an available bandwidth of the cell.

In some demonstrative embodiments, UE 102 may receive the one or more messages from node 104 and may utilize the cellular load information and/or the WLAN load information, for example, to select between connecting to node 104 and connecting to AP 106, e.g., as described in detail below. Additionally or alternatively, UE 102 may utilize the cellular load information and/or the WLAN load information for any other purpose.

In some demonstrative embodiments, the one or more messages may include WLAN information corresponding to one or more WLANs. The WLAN information may include, for example, WLAN access information for accessing the WLAN controlled by AP 106.

In one example, UE 102 may be configured to access a WLAN, e.g., the WLAN controlled by AP 106, based on the WLAN access information, e.g., as described below.

In some demonstrative embodiments, the WLAN access information corresponding to a WLAN may include information, which may be used by a UE, e.g., UE 102, to access and/or connect to the WLAN. For example, the WLAN access information corresponding to the WLAN controlled by AP 106 may include an address of AP 106, a wireless communication frequency band for communicating with AP 106 and/or any other information, e.g., as defined by the IEEE 802.11 and/or the WGA specifications.

In some demonstrative embodiments, UE 102 may be configured to make a mobility decision, e.g., for connecting to, or disconnecting from, a WLAN, e.g., the WLAN controlled by AP 106, based the WLAN load information, the cellular load information and/or the WLAN access information.

In some demonstrative embodiments, UE 102 may utilize the WLAN load information, the cellular load information and/or the WLAN access information in addition to or instead of other information relating to the WLAN, e.g., the signal strength of signals received from AP 106.

In some demonstrative embodiments, UE 102 may receive part of, or even all of, the WLAN information from one or more other sources, e.g., other than node 104. For example, UE 102 may receive the WLAN information from AP 106 and/or via one or more intermediate devices, for example, in the form of BSS Load and/or BSS available admission capacity information, e.g., accordance with the IEEE 802.11 specifications.

In some demonstrative embodiments, node 104 may transmit at least part of the WLAN information, e.g., as described in detail below.

In some demonstrative embodiments, node 104 may transmit the WLAN load information, the WLAN access information and/or any other WLAN information as part of one or more Radio-Resource Control (RRC) signaling messages.

In some demonstrative embodiments, the RRC signaling messages may include one or more System Information Block (SIB) messages. For example, node 104 may broadcast one or more SIB messages including the WLAN information. For example, the WLAN information may be included as part of at least one dedicated field of the SIB.

In some demonstrative embodiments, the SIB message may include an SIB defined for non-3GPP access network discovery.

For example, the SIB may include the following field ("WLAN parameter field"):

```
parametersWLAN                    SEQUENCE {
    wlanLoad                          WlanLoad                OPTIONAL,
    wlanAvailableBandwidth            WlanAvailableBandwidth
OPTIONAL,
```

```
        wlanChannels              WlanChannels
OPTIONAL
        }
```

The WLAN parameter field may include, for example, a WLAN load of the WLAN, an available bandwidth of the WLAN, and/or one or more WLAN channels utilized by the WLAN.

In one example, the WLAN information may be included as part of at least one dedicated field of a SIB type 8 ("SIB 8") Information Element (IE), e.g., as follows:

```
-- ASN1START
SystemInformationBlockType8 ::=    SEQUENCE {
    systemTimeInfo              SystemTimeInfoCDMA2000      OPTIONAL, -
- Need OR
    searchWindowSize            INTEGER (0..15)             OPTIONAL, -
- Need OR
    parametersHRPD              SEQUENCE {
        preRegistrationInfoHRPD         PreRegistrationInfoHRPD,
        cellReselectionParametersHRPD   CellReselectionParametersCDMA2000
OPTIONAL -- Need OR
    }                                                       OPTIONAL, -- Need
OR
    parameters1XRTT             SEQUENCE {
        csfb-RegistrationParam1XRTT     CSFB-RegistrationParam1XRTT
OPTIONAL, -- Need OP
        long-CodeState1XRTT             BIT STRING (SIZE (42))   OPTIONAL, -
- Need OR
        cellReselectionParameters1XRTT  CellReselectionParametersCDMA2000
OPTIONAL -- Need OR
    }                                                       OPTIONAL, -- Need
OR
    ...,
    lateNonCriticalExtension    OCTET STRING                OPTIONAL, --
Need OP
    [[ csfb-SupportForDualRxUEs-r9       BOOLEAN
OPTIONAL, -- Need OR
        cellReselectionParametersHRPD-v920 CellReselectionParametersCDMA2000-
v920 OPTIONAL, -- Cond NCL-HRPD
        cellReselectionParameters1XRTT-v920CellReselectionParametersCDMA2000-
v920 OPTIONAL, -- Cond NCL-1XRTT
        csfb-RegistrationParam1XRTT-v920    CSFB-RegistrationParam1XRTT-v920
OPTIONAL, -- Cond REG-1XRTT
        ac-Barring-Config1XRTT-r9       AC-Barring-Config1XRTT-r9   OPTIONAL -
- Cond REG-1XRTT
    ]],
    [[ csfb-DualRxTxSupport-r10         ENUMERATED {true}       OPTIONAL -
- Cond REG-1XRTT
    ]]
    parametersWLAN              SEQUENCE {
        wlanLoad                WlanLoad                    OPTIONAL,
        wlanAvailableBandwidth          WlanAvailableBandwidth
OPTIONAL,
        wlanChannels                    WlanChannels
OPTIONAL
    }
}
CellReselectionParametersCDMA2000 ::= SEQUENCE {
    bandClassList               BandClassListCDMA2000,
    neighCellList               NeighCellListCDMA2000,
    t-ReselectionCDMA2000       T-Reselection,
    t-ReselectionCDMA2000-SF    SpeedStateScaleFactors      OPTIONAL -
- Need OP
}
CellReselectionParametersCDMA2000-v920 ::= SEQUENCE {
    neighCellList-v920          NeighCellListCDMA2000-v920
}
```

```
NeighCellListCDMA2000 ::=              SEQUENCE (SIZE (1..16)) OF NeighCellCDMA2000
NeighCellCDMA2000 ::= SEQUENCE {
    bandClass                          BandclassCDMA2000,
    neighCellsPerFreqList              NeighCellsPerBandclassListCDMA2000
}
NeighCellsPerBandclassListCDMA2000 ::= SEQUENCE (SIZE (1..16)) OF
NeighCellsPerBandclassCDMA2000
NeighCellsPerBandclassCDMA2000 ::= SEQUENCE 1
    arfcn                              ARFCN-ValueCDMA2000,
    physCellIdList                     PhysCellIdListCDMA2000
}
NeighCellListCDMA2000-v920 ::=         SEQUENCE (SIZE (1..16)) OF
NeighCellCDMA2000-v920
NeighCellCDMA2000-v920 ::=             SEQUENCE {
    neighCellsPerFreqList-v920         NeighCellsPerBandclassListCDMA2000-v920
}
NeighCellsPerBandclassListCDMA2000-v920 ::= SEQUENCE (SIZE (1..16)) OF
NeighCellsPerBandclassCDMA2000-v920
NeighCellsPerBandclassCDMA2000-v920 ::=    SEQUENCE {
    physCellIdList-v920                PhysCellIdListCDMA2000-v920
}
PhysCellIdListCDMA2000 ::=             SEQUENCE (SIZE (1..16)) OF
PhysCellIdCDMA2000
PhysCellIdListCDMA2000-v920 ::=        SEQUENCE (SIZE (0..24)) OF
PhysCellIdCDMA2000
BandClassListCDMA2000 ::=              SEQUENCE (SIZE (1..maxCDMA-BandClass)) OF
BandClassInfoCDMA2000
BandClassInfoCDMA2000 ::= SEQUENCE {
    bandClass                          BandclassCDMA2000,
    cellReselectionPriority            CellReselectionPriority
    OPTIONAL, -- Need OP
    threshX-High                       INTEGER (0..63),
    threshX-Low                        INTEGER (0..63),
    ...
}
AC-Barring-ConfiglXRTT-r9 ::=          SEQUENCE {
    ac-Barring0to9-r9                  INTEGER (0..63),
    ac-Barring10-r9                    INTEGER (0..7),
    ac-Barring11-r9                    INTEGER (0..7),
    ac-Barring12-r9                    INTEGER (0..7),
    ac-Barring13-r9                    INTEGER (0..7),
    ac-Barring14-r9                    INTEGER (0..7),
    ac-Barring15-r9                    INTEGER (0..7),
    ac-Barring-Msg-r9                  INTEGER (0..7),
    ac-BarringReg-r9                   INTEGER (0..7),
    ac-BarringEmg-r9                   INTEGER (0..7)
}
-- ASN1STOP
```

In some demonstrative embodiments, the SIB message may include a dedicated SIB defined for communicating the WLAN information.

In one example, the WLAN information may be included as part of a dedicated SIB type 14 ("SIB 14"), or any other type. The SIB 14 may be defined, for example, to include information relevant for inter-Radio-Access-Technologies (inter-RAT) re-selection. For example, the SIB 14 may include information about WLAN frequencies/or and WLAN neighboring access points, which may be relevant for re-selection to/from WLAN. For example, the SIB 14 may include the WLAN information, e.g., as follows:

In some demonstrative embodiments, the RRC signaling messages may include one or more dedicated RRC signaling messages. For example, node 104 may transmit to UE 102 one or more dedicated RRC signaling messages including the WLAN information.

In some demonstrative embodiments, the dedicated RRC signaling message may include the WLAN information field, e.g., as described above with reference to the SIB message.

In some demonstrative embodiments, the WLAN information field may be included as part of at least one dedicated field of a predefined RRC signaling message.

In one example, the WLAN information may be included as a downlink information transfer ("DLInformationTransfer") RRC signaling message, e.g., as follows:

```
SystemInformationBlockType14 ::=    SEQUENCE {
    wlanLoad              WlanLoad                  OPTIONAL,
    wlanAvailableBandwidth    WlanAvailableBandwidth
OPTIONAL,
    wlanChannels              WlanChannels
OPTIONAL
}
```

```
-- ASN1START
DLInformationTransfer ::=           SEQUENCE {
    rrc-TransactionIdentifier           RRC-TransactionIdentifier,
    criticalExtensions                  CHOICE {
        c1                                  CHOICE {
            dlInformationTransfer-r8            DLInformationTransfer-r8-IEs,
            spare3 NULL, spare2 NULL, spare1 NULL
        },
        criticalExtensionsFuture            SEQUENCE { }
    }
}
DLInformationTransfer-r8-IEs ::=    SEQUENCE {
    dedicatedInfoType                   CHOICE {
        dedicatedInfoNAS                    DedicatedInfoNAS,
        dedicatedInfoCDMA2000-1XRTT         DedicatedInfoCDMA2000,
        dedicatedInfoCDMA2000-HRPD          DedicatedInfoCDMA2000
    },
    nonCriticalExtension                DLInformationTransfer-v8a0-IEs
    OPTIONAL
}
DLInformationTransfer-v8a0-IEs ::= SEQUENCE {
    lateNonCriticalExtension        OCTET STRING                OPTIONAL, --
Need OP
    nonCriticalExtension            SEQUENCE { }                OPTIONAL -
- Need OP
}
parametersWLAN                      SEQUENCE {
    wlanLoad                            WlanLoad                OPTIONAL,
    wlanAvailableBandwidth              WlanAvailableBandwidth
OPTIONAL,
    wlanChannels                        WlanChannels
OPTIONAL
}
-- ASN1STOP
```

In some demonstrative embodiments, the dedicated RRC signaling message may include a particular RRC message ("the WLAN information RRC message") dedicated for communicating the WLAN information.

In some demonstrative embodiments, the WLAN information RRC message may be transmitted from node 104 to UE 102 in response to a request from UE 102.

In some demonstrative embodiments, the WLAN information RRC message may be transmitted (pushed) from node 104 to UE 102 in an unsolicited manner, e.g., even if a request from UE 102 is not received. For example, node 104 may transmit the WLAN information RRC message, periodically or according to any other timing scheme.

In some demonstrative embodiments, node 104 may transmit to UE 102 one or more messages including cellular load information relating to the cell controlled by node 104, e.g., as described below.

In some demonstrative embodiments, the cellular load information may include, for example, information of a bandwidth, which may be allocated by node 104 to UE 102, e.g., in analogy to WLAN Available Admission Capacity information.

In some demonstrative embodiments, the cellular load information may be in a form suitable for comparison with the WLAN load information, e.g., to enable UE 102 to compare between the WLAN load and the cellular load.

In one example, the cellular load information may include an available network capacity, for example, in the form of absolute units, e.g., Megabit per second (MB/s).

In another example, the cellular load information may be in the form of relative units, e.g., including a percentage value and maximum or average bandwidth, which may be supported for communication via the cellular network.

In some demonstrative embodiments, node 104 may transmit the cellular load information as part of one or more RRC signaling messages.

In some demonstrative embodiments, the RRC signaling messages may include one or more SIB messages. For example, node 104 may broadcast one or more SIB messages including the cellular load information.

In some demonstrative embodiments, the SIB message may include an SIB defined for non-3GPP access network discovery. For example, the cellular load information may be included as part of at least one dedicated field of the SIB.

In one example, the cellular load information may be included as part of at least one dedicated field of the SIB 8 IE.

In some demonstrative embodiments, the SIB message may include a dedicated SIB defined for communicating the cellular load information.

In one example, the cellular load information may be included as part of a dedicated SIB type 15 IE or the SIB type 14 IE, or any other SIB type. The SIB 15 IE may be defined, for example, to include information relevant for inter-RAT re-selection.

In some demonstrative embodiments, the RRC signaling messages may include one or more dedicated RRC signaling messages. For example, node 104 may transmit to UE 102 one or more dedicated RRC signaling messages including the cellular load information.

In some demonstrative embodiments, the dedicated RRC signaling message may include the cellular load information field, e.g., as described above with reference to the SIB message.

In some demonstrative embodiments, the cellular load information field may be included as part of at least one dedicated field of a predefined RRC signaling message.

In one example, the cellular load information may be included as a DLInformationTransfer RRC signaling message.

In some demonstrative embodiments, the dedicated RRC signaling message may include a particular RRC message ("the cellular load information RRC message") dedicated for communicating the cellular load information.

In some demonstrative embodiments, the cellular load information RRC message may be transmitted from node 104 to UE 102 in response to a request from UE 102.

In some demonstrative embodiments, the cellular load information RRC message may be transmitted ("pushed") from node 104 to UE 102 in an unsolicited manner, e.g., even if a request from UE 102 is not received. For example, node 104 may transmit the cellular load information RRC message, periodically or according to any other timing scheme.

In some demonstrative embodiments, node 104 may transmit the cellular load information and/or the WLAN load information in separate messages and/or IEs, e.g., a first message or IE including the cellular load information and a second message or IE including the WLAN load information.

In some demonstrative embodiments, node 104 may transmit the cellular load information and the WLAN load information as part of a common message or IE. For example, one or more of the SIB and/or dedicated RRC signaling messages described above may include both the WLAN information field and the cellular load information field.

In some demonstrative embodiments, utilizing the RRC signaling messages for communicating WLAN information from node 104 to UE 102, e.g., as described above, may enable UE 102 to use a cellular radio for receiving the WLAN information from node 104, e.g., instead of using a WLAN radio for searching for and/or communicating with AP 106.

Utilizing the RRC signaling messages for communicating WLAN information from node 104 to UE 102, e.g., as described above, may enable reducing an activity of UE 102, e.g., for searching for one or more WLANs and/or for communicating with one or more WLAN devices, e.g., AP 106.

Accordingly, utilizing the RRC signaling messages for communicating WLAN information from node 104 to UE 102, e.g., as described above may enable reducing a power consumption of UE 102.

In some demonstrative embodiments, node 104 may receive the WLAN information from one or more WLAN devices, for example, one or more APs, e.g., AP 106.

In some demonstrative embodiments, node 104 may request the WLAN information, e.g., the WLAN load information, from one or more of the WLAN devices.

In some demonstrative embodiments, node 104 may transmit at least one load reporting request to at least one AP, e.g., AP 106. Node 104 may receive from the AP WLAN load information of the WLAN controlled by the AP, e.g., as part of a beacon and/or any other communication.

In some demonstrative embodiments, UE 102 may be configured to select between connecting to a cellular network and connecting to a WLAN, based on load information corresponding to one or more WLANs and/or load information corresponding to one or more cellular networks, e.g., as described in detail below.

In some demonstrative embodiments, wireless communication unit 110 may receive WLAN load information indicating a load of at least one WLAN controlled by at least one AP, e.g., the WLAN controlled by AP 106.

In some demonstrative embodiments, UE 102, e.g., wireless communication unit 110, may be configured to select, e.g., based on the WLAN load information, between connecting to the AP and connecting to a cellular node, e.g., node 104.

In some demonstrative embodiments, wireless communication unit 110 may receive the WLAN load information from AP 106, e.g., as described above.

In some demonstrative embodiments, wireless communication unit 110 may receive the WLAN load information from node 104, e.g., as described above.

In some demonstrative embodiments, wireless communication unit 110 may also receive from node 104 WLAN access information for accessing the WLAN.

For example, wireless communication unit 110 may receive from node 104 one or more messages including the WLAN load information and/or the WLAN access information, e.g., as described above.

In some demonstrative embodiments, wireless communication unit 110 may receive cellular load information indicating a load of the cellular network controlled by cellular node 104. For example, node 104 may transmit to UE 102 one or more messages including the cellular load information e.g., as described above.

In some demonstrative embodiments, UE 102, e.g., wireless communication unit 110, may select between connecting to AP 106 and connecting to the cellular node controlled by node 104 based on the cellular node information.

In some demonstrative embodiments, UE 102, e.g., wireless communication unit 110, may select to connect to AP 106 based on a comparison between the load of the WLAN controlled by AP 106 and the load of the cellular network controlled by node 104.

In some demonstrative embodiments, UE 102, e.g., wireless communication unit 110, may select to connect to AP 106 based on at least one criterion. The at least one criterion may include, for example, a comparison between the load of the WLAN controlled by AP 106 and a predefined threshold, a comparison between the load of a plurality of WLANs, e.g., including the WLAN controlled by AP 106 and one or more other WLANs controlled by one or more other APs; an admission capacity of AP 106; a type of information to be communicated by UE 102; a comparison between the load of the WLAN controlled by AP 106 and cellular network; and/or any other criterion.

In one example, UE 102 may select to connect to AP 106 for communicating a first type of data, e.g., video data, and to connect to node 104 for communicating a second type of data, e.g., Voice over Internet Protocol (VoIP) data.

In some demonstrative embodiments, wireless communication unit 110 may receive, e.g., after selecting to connect to the WLAN controlled by AP 106, updated WLAN load information indicating an updated load of the WLAN controlled by AP 106 and/or updated cellular load information indicating an updated load of the cellular network controlled by node 104.

In some demonstrative embodiments, UE 102, e.g., wireless communication unit 110, may select to disconnect from AP 106 and connect, for example, to node 104, e.g., based on the updated WLAN load information and/or the updated cellular load information.

Figure 2:
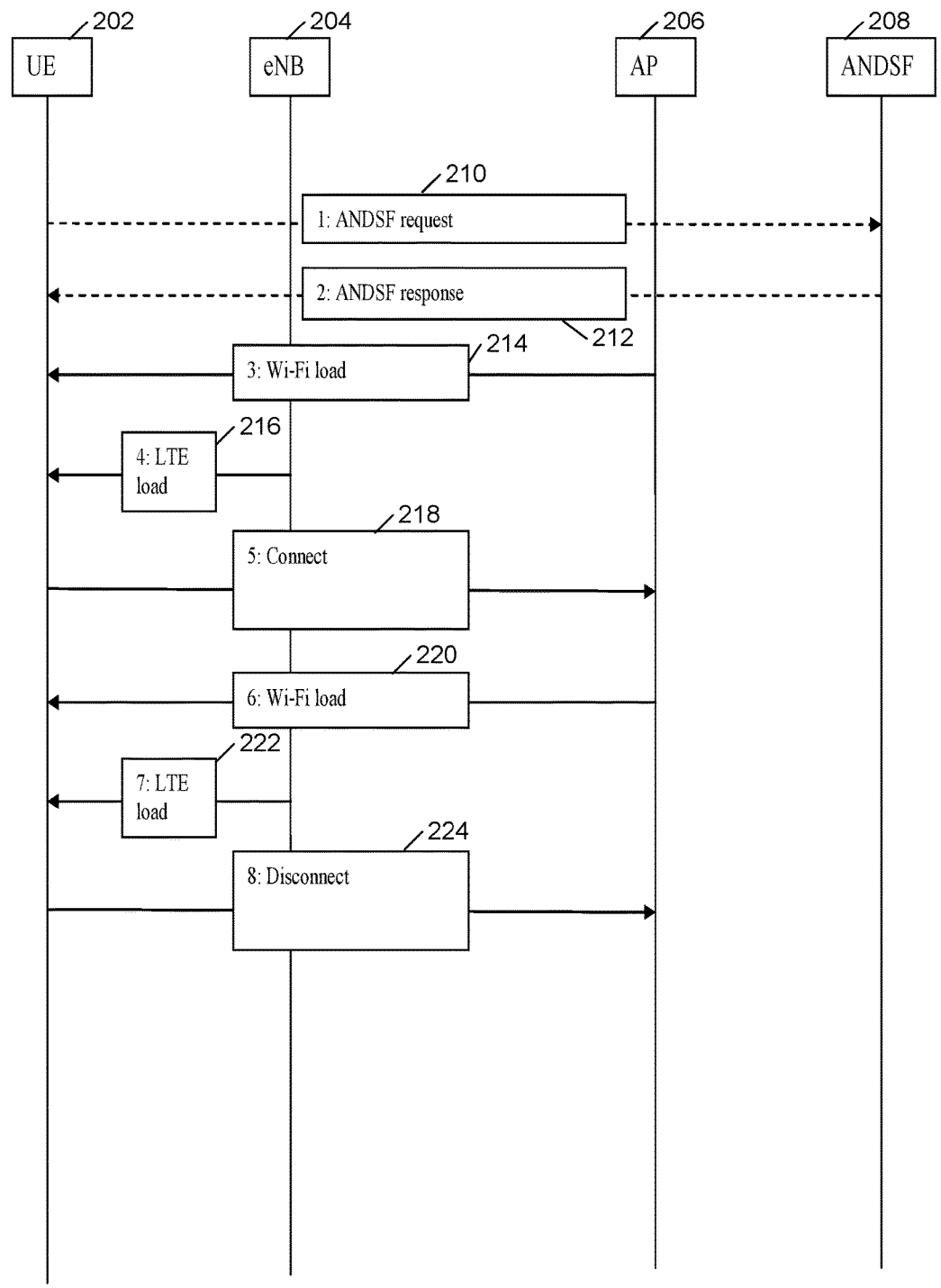
FIG. 2 is a schematic illustration of a sequence diagram of selectively connecting a User Equipment (UE) to a Wireless-Local-Area-Network (WLAN), in accordance with one demonstrative embodiment.

FIG. 2 is a schematic illustration of a sequence diagram of selectively connecting a UE 202 to at least one WLAN controlled by at least one AP 206, in accordance with one demonstrative embodiment. In some demonstrative embodiments, UE 202 may perform the functionality of UE 102 (FIG. 1) and/or AP 206 may perform the functionality of AP 106 (FIG. 1).

In some demonstrative embodiments, UE 202 may be configured to selectively connect to AP 206 or to a cellular node 204 based on WLAN load information corresponding to the WLAN and/or cellular load information corresponding to a cell controlled by cellular node 204, e.g., as described below. Node 204 may, for example, perform the functionality of node 104 (FIG. 1).

In some demonstrative embodiments, UE 202 may receive WLAN access information for accessing the WLAN controlled by AP 206. In one example, UE 202 may transmit an Access Network Discovery and Selection Function (ANDSF) request 210 to an ANDSF entity 208 and, in response, the ANDSF request 210, UE 202 may receive from ANDSF entity 208 an ANDSF response 212 including the access information corresponding to AP 206. In other embodiments, UE 202 may receive the access information corresponding to AP 206 via any other message and/or from any other cellular and/or WLAN entity.

In some demonstrative embodiments, UE 202 may receive WLAN load information 214 from AP 206. For example, AP 206 may broadcast WLAN load information 214, e.g., as described above.

In some demonstrative embodiments, UE 202 may receive cellular load information 216 from node 204. For example, node 204 may broadcast and/or transmit to UE 202 one or more messages, for example, RRC signaling messages, including cellular load information 216, e.g., as described above.

In some demonstrative embodiments, UE 202 may select to connect to AP 206 or to node 204 based on WLAN load information 214, cellular load information 216 and/or any other information and/or criteria, e.g., as described above.

In some demonstrative embodiments, UE 202 may select to connect 218 to AP 206, e.g., if UE 202 determines that WLAN offload to AP 206 is beneficial, for example, if the WLAN load is lesser than the cellular load.

In some demonstrative embodiments, UE 202 may receive updated WLAN load information 220 from AP 206. For example, AP 206 may broadcast updated WLAN load information 220, e.g., as described above.

In some demonstrative embodiments, UE 202 may receive updated cellular load information 222 from node 204. For example, node 204 may broadcast and/or transmit to UE 202 one or more messages, for example, RRC signaling messages, including updated cellular load information 222, e.g., as described above.

In some demonstrative embodiments, UE 202 may select whether or not to disconnect from AP 206 and to connect to node 204 based on updated WLAN load information 220, updated cellular load information 222 and/or any other information and/or criteria, e.g., as described above.

In some demonstrative embodiments, UE 202 may select to disconnect 224 from AP 206, e.g., if UE 202 determines that the WLAN connection is not beneficial any more, for example, if the updated WLAN load is greater than the cellular load.

Figure 3:
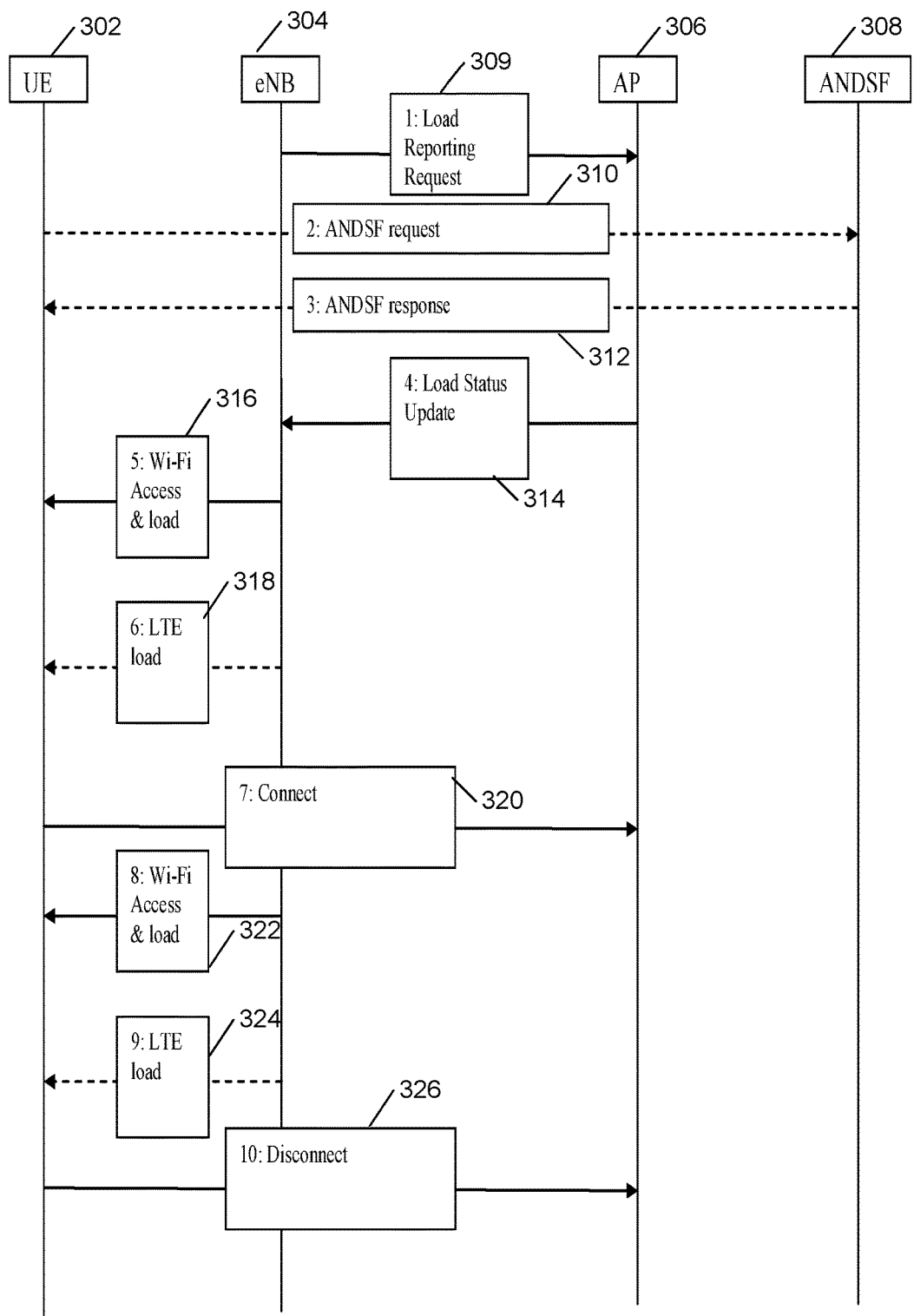
FIG. 3 is a schematic illustration of a sequence diagram of selectively connecting a UE to a WLAN, in accordance with another demonstrative embodiment.

FIG. 3 is a schematic illustration of a sequence diagram of selectively connecting a UE 302 to at least one WLAN controlled by at least one AP 306, in accordance with another demonstrative embodiment. In some demonstrative embodiments, UE 302 may perform the functionality of UE 102 (FIG. 1) and/or AP 306 may perform the functionality of AP 106 (FIG. 1).

In some demonstrative embodiments, UE 302 may be configured to selectively connect to AP 306 or to a cellular node 304 based on WLAN load information corresponding to the WLAN and/or cellular load information corresponding to a cell controlled by cellular node 304, e.g., as described below. Node 304 may, for example, perform the functionality of node 104 (FIG. 1).

In some demonstrative embodiments, node 304 may transmit a load reporting request 309 to AP 306. Load reporting request 309 may request AP 306 for WLAN load information corresponding to AP 306, e.g., as described above. For example, node 304 may transmit a plurality of load reporting requests 309 to a plurality of APs, which are connected to node 304.

In some demonstrative embodiments, node 304 may receive from AP 306 a WLAN load status update 314 including WLAN load information corresponding to AP 306, e.g., as described above. AP 306 may transmit load status update 314 periodically, based on one or more triggers, e.g., based on a request from eNB 304, and/or according to any WLAN load update scheme.

In some demonstrative embodiments, node 304 may transmit to UE 302 WLAN information 316 including the WLAN load information and WLAN access information corresponding to AP 306. For example, node 304 may broadcast and/or transmit to UE 302 one or more messages, for example, RRC signaling messages, including the WLAN information 316, e.g., as described above.

In some demonstrative embodiments, UE 302 may optionally receive WLAN access information for accessing the WLAN controlled by AP 306 from an ANDSF entity 308. In one example, UE 302 may transmit an ANDSF request 310 to ANDSF entity 308 and, in response, the ANDSF request 310, UE 302 may receive from ANDSF entity 308 an ANDSF response 312 including the access information corresponding to AP 306.

In some demonstrative embodiments, UE 302 may be configured such that the WLAN access information of WLAN information 316 may supersede the WLAN access information received from ANDSF entity 308.

In some demonstrative embodiments, UE 302 may optionally receive cellular load information 318 from node 304. For example, node 304 may broadcast and/or transmit to UE 302 one or more messages, e.g., RRC signaling messages, including cellular load information 318, e.g., as described above.

In some demonstrative embodiments, UE 302 may select to connect to AP 306 or to node 304 based on WLAN information 316, cellular load information 318 and/or any other information and/or criteria, e.g., as described above.

In some demonstrative embodiments, WLAN information 316 may include WLAN information corresponding to one or more APs 306, and UE 302 may select to connect 320 to an AP 306, e.g., when UE 302 is within a communication range of the AP 306 and/or if UE 302 determines that WLAN offload to AP 306 is beneficial, for example, if the WLAN load is lesser than the cellular load.

In some demonstrative embodiments, UE 302 may receive updated WLAN information 322 from node 304. For example, node 304 may broadcast or transmit to UE 302 updated WLAN information 322, e.g., as described above.

In some demonstrative embodiments, UE 302 may optionally receive updated cellular load information 324 from node 304. For example, node 304 may broadcast and/or transmit to UE 302 one or more messages, e.g., RRC signaling messages, including updated cellular load information 324, e.g., as described above.

In some demonstrative embodiments, UE 302 may select whether or not to disconnect from AP 306 and to connect to node 304 based on updated WLAN load information of updated WLAN information 322, updated cellular load information 324 and/or any other information and/or criteria, e.g., as described above.

In some demonstrative embodiments, UE 302 may select to disconnect 326 from AP 306 and connect to node 304, e.g., if UE 302 determines that the WLAN connection is not beneficial any more, for example, if the updated WLAN load has increased to a level at which cellular access via node 304 may be preferable.

Referring back to FIG. 1, in some demonstrative embodiments, node 104 may be configured to select for UE 102 one or more WLANs for communication, for example, based on the load of the WLANs and/or based on any other criterion, e.g., as described in detail below.

In some demonstrative embodiments, node 104 may be configured to transmit to UE 102 a message including WLAN information, which includes WLAN access information for accessing the one or more selected WLANs.

For example, node 104 may transmit the WLAN information as part of one or more RRC signaling messages, e.g., as described above. UE 102 may access a WLAN, e.g., a WLAN controlled by AP 106, based on the WLAN access information corresponding to the WLAN.

In some demonstrative embodiments, node 104 may selectively enable UE 102 to connect to one or more selected WLANs, for example, by providing UE 102 with the WLAN access information corresponding to the one or more selected WLANs, e.g., while not providing to UE 102 WLAN access information of one or more other WLANs.

In some demonstrative embodiments, node 104 may receive the WLAN load information of the WLAN controlled by AP 106. Node 104 may communicate directly with AP 106 to receive the WLAN information, or may receive the WLAN load information corresponding to AP 106 via one or more intermediate devices, e.g., a WLAN AC.

For example, node 104 may transmit at least one load reporting request to at least one AP, e.g., AP 106, and may receive from the AP WLAN load information of the WLAN controlled by the AP, e.g., as described above.

In some demonstrative embodiments, node 104 may receive the WLAN load information corresponding to a plurality of WLANs, e.g., periodically and/or at any other timing.

In some demonstrative embodiments, node 104 may select the one or more selected WLANs based on a congestion and/or load of the WLANs.

For example, node 104 may receive load information of a plurality of APs, e.g., including AP 106. Node 104 may select one or more APs of the plurality of APs based, for example, on the load information. For example, node 104 may select the one or more APs based on at least one criterion. The at least one criterion may include, for example, a comparison between the load of the WLAN controlled by the plurality of APs and a predefined threshold, a comparison between the load of a plurality of APs; an admission capacity of the APs; a type of information to be communicated by UE 102; a comparison between the WLAN and cellular networks load; and/or any other criterion.

In some demonstrative embodiments, node 104 may control UE 102 to selectively connect only to the one or more selected APs, for example, by providing UE 102 with the access information of the selected APs, e.g., while not providing to UE the access information of one or more other APs of the plurality of APs.

In some demonstrative embodiments, node 104 may control UE 102 to attempt connecting only to an AP, e.g., AP 106, which is capable of providing a connection having a first throughput, which is equal to or greater than a second throughput, which may be provided by node 104 within the cell.

In some demonstrative embodiments, node 104 may control UE 102 to avoid, reduce and/or substantially eliminate unnecessary scanning and/or connection attempts to WLANs offering reduced or degraded performance, e.g., reduced throughput and/or increased load, compared, for example, to the performance offered by other WLANs and/or to node 104.

Figure 4:
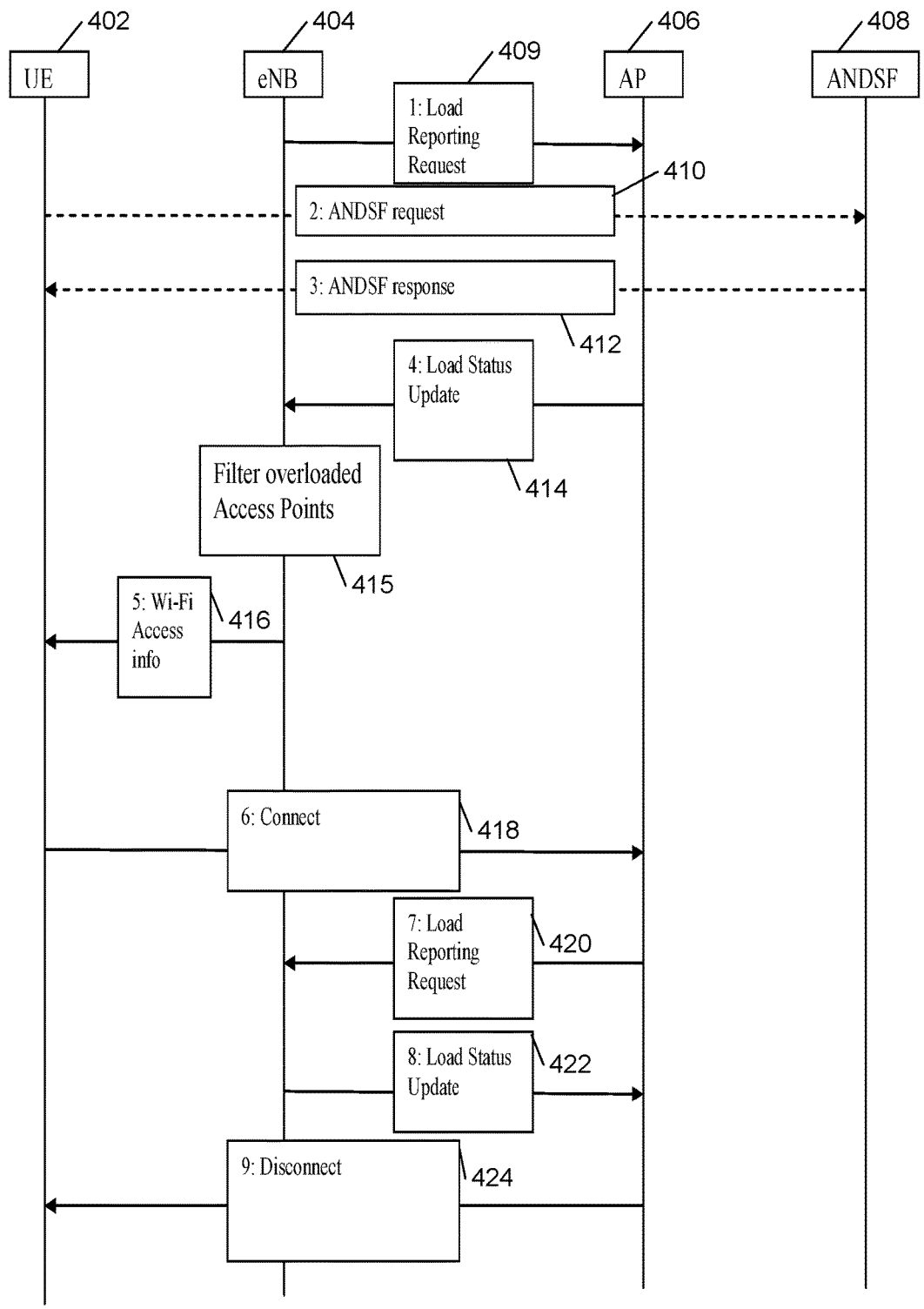
FIG. 4 is a schematic illustration of a sequence diagram of selectively connecting a UE to a WLAN, in accordance with yet another demonstrative embodiment.

Reference is now made to FIG. 4, which schematically illustrates a sequence diagram of selectively connecting a UE 402 to a WLAN controlled by at least one AP 406, in accordance with another demonstrative embodiment. In some demonstrative embodiments, UE 402 may perform the functionality of UE 102 (FIG. 1) and/or AP 406 may perform the functionality of AP 106 (FIG. 1).

In some demonstrative embodiments, a cellular node 404 may be configured selectively provide WLAN access information to UE 402 to selectively enable UE 402 to connect to one or more WLANs, which may be selected by node 404 based on WLAN load information corresponding to the one or more WLANs and/or cellular load information corresponding to a cell controlled by cellular node 404, e.g., as described below. Node 404 may, for example, perform the functionality of node 104 (FIG. 1).

In some demonstrative embodiments, node 404 may transmit a load-reporting request 409 to AP 406. Load reporting request 409 may request AP 406 for WLAN load information corresponding to AP 406, e.g., as described above. For example, node 404 may transmit a plurality of load reporting requests 409 to a plurality of APs, which are connected to node 404.

In some demonstrative embodiments, node 404 may receive from AP 406 a WLAN load status update 414 including WLAN load information corresponding to AP 406, e.g., as described above. AP 406 may transmit load status update 414 periodically, based on one or more triggers, e.g., based on a request from eNB 404, and/or according to any WLAN load update scheme.

In some demonstrative embodiments, node 404 may receive WLAN load information from a plurality of APs 406 and may select 415 one or more of the plurality of the APs 406, e.g., as described above. For example, node 404 may "filter out" one or more overloaded APs 406, e.g., one or more APs 406 having a WLAN load greater than a predefined threshold, and/or a predefined number of APs 406 having the greatest WLAN load among the plurality of APs 406.

In some demonstrative embodiments, node 404 may transmit to UE 402 WLAN information 416 including WLAN access information corresponding to the one or more selected APs 406. For example, node 404 may broadcast and/or transmit to UE 402 one or more messages, for example, RRC signaling messages, including the WLAN information 416, e.g., as described above.

In some demonstrative embodiments, UE 402 may optionally receive WLAN access information for accessing the WLAN controlled by AP 406 from an ANDSF entity 408. In one example, UE 402 may transmit an ANDSF request 410 to ANDSF entity 408 and, in response, the ANDSF request 410, UE 402 may receive from ANDSF entity 408 an ANDSF response 412 including the access information corresponding to AP 406.

In some demonstrative embodiments, UE 402 may be configured such that the WLAN access information of WLAN information 416 may supersede the WLAN access information received from ANDSF entity 408.

In some demonstrative embodiments, UE 402 may connect 418 to AP 406 based on the WLAN access information of AP 406 provided by node 404, for example, when UE 402 is within a communication range of the AP 406.

In some demonstrative embodiments, AP 406 may transmit a load status request 420 to node 404.

In some demonstrative embodiments, node 404 may transmit a load status update 422 including cellular load information corresponding to a cell controlled by node 404, e.g., in response to load status request 420.

In some demonstrative embodiments, AP 406 may determine whether or not the WLAN connection between UE 402 and AP 406 is preferable compared to the cellular connection between UE 402 and node 404, for example, based on a comparison between the WLAN load of the WLAN controlled by AP 406 and the cellular load reported by load status update 422. For example, AP 406 may determine that the cellular connection is more preferable than the WLAN connection, e.g., if the WLAN load is equal to or greater than the cellular load, if the WLAN load is greater than a predefined threshold, and/or based on any other criterion.

In some demonstrative embodiments, AP 406 may select to terminate 424 the WLAN connection with UE 402, e.g., if AP 406 determines that the WLAN connection is not beneficial any more, for example, if the WLAN load has increased to a level at which cellular access via node 404 may be preferable. In one example, AP 406 may indicate to UE 402 that the cellular connection is now preferable and should be used instead of the WLAN connection.

Figure 5:
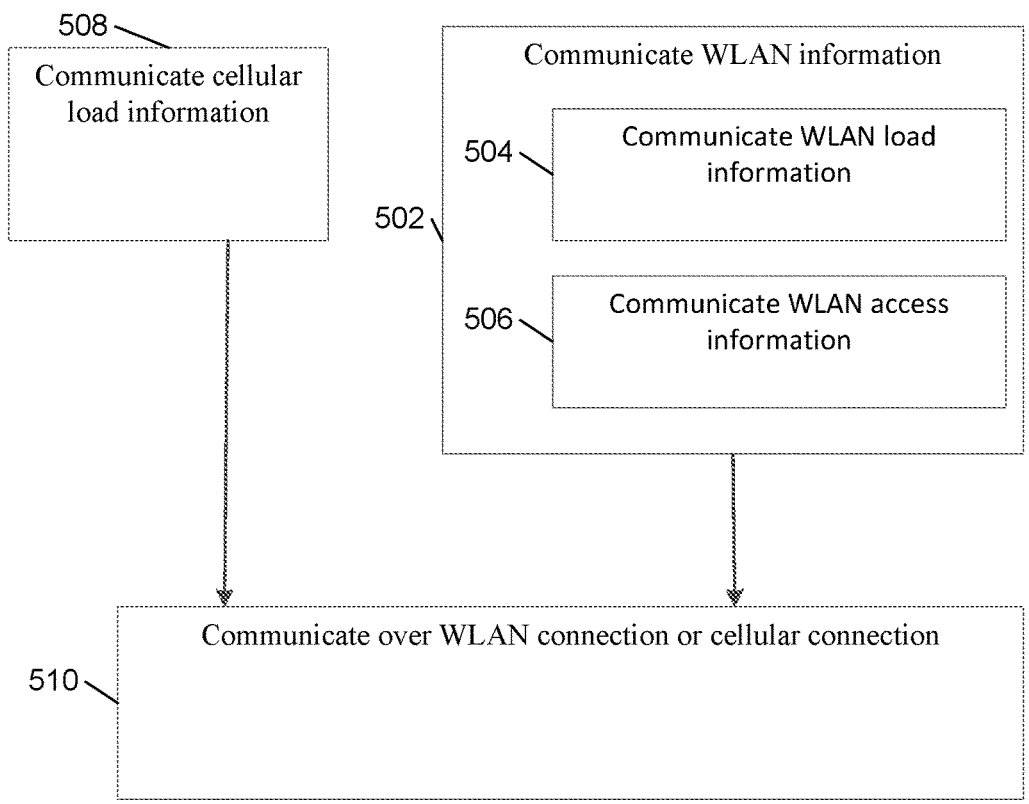
FIG. 5 is a schematic flow-chart illustration of a method of wireless communication, in accordance with some demonstrative embodiments.

Reference is made to FIG. 5, which schematically illustrates a method of WLAN communication in conjunction with cellular communication, in accordance with some demonstrative embodiments. In some embodiments, one or more of the operations of the method of FIG. 5 may be performed by a wireless communication system e.g., system 100 (FIG. 1); a wireless communication device, e.g., UE 102 (FIG. 1), node 104 (FIG. 1) and/or AP 106 (FIG. 1); and/or a wireless communication unit, e.g., wireless communication units 110 and/or 130 (FIG. 1).

As indicated at block 502, the method may include communicating WLAN load information corresponding to one or more WLANs.

In one example, UE 102 (FIG. 1) may receive WLAN information from AP 106 (FIG. 1), e.g., as described above.

In another example, node 104 (FIG. 1) may receive WLAN information from AP 106 (FIG. 1), e.g., as described above.

In another example, UE 102 (FIG. 1) may receive WLAN information from node 104 (FIG. 1), e.g., as described above.

As indicated at block 504, communicating the WLAN information may include communicating WLAN load information corresponding to the one or more WLANs.

In one example, UE 102 (FIG. 1) may receive WLAN load information from AP 106 (FIG. 1), e.g., as described above.

In another example, node 104 (FIG. 1) may receive WLAN load information from AP 106 (FIG. 1), e.g., as described above.

In another example, UE 102 (FIG. 1) may receive WLAN load information from node 104 (FIG. 1), e.g., as described above.

As indicated at block 506, communicating the WLAN information may include communicating WLAN access information corresponding to the one or more WLANs.

In one example, UE 102 (FIG. 1) may receive WLAN access information from node 104 (FIG. 1), e.g., as described above.

As indicated at block 508, the method may include communicating cellular load information corresponding to at least one cell.

In one example, UE 102 (FIG. 1) may receive cellular load information from node 104 (FIG. 1), e.g., as described above.

In another example, AP 106 (FIG. 1) may receive cellular load information from mode 104 (FIG. 1), e.g., as described above.

As indicated at block 510, the method may include communicating over a WLAN connection or a cellular connection based on the WLAN information and/or the cellular information.

In one example, UE 102 (FIG. 1) may select between communicating with AP 106 and communicating with node 104 (FIG. 1) based, for example, on the WLAN load information and/or the cellular load information.

In another example, node 104 (FIG. 1) may cause UE 102 (FIG. 1) to communicate with one or more selected APs 106 (FIG. 1) and/or with node 104 (FIG. 1), based, for example, on the WLAN load of a plurality of WLANs and/or the cellular load of the cell controlled by node 104 (FIG. 1), e.g., as described above.

Figure 6:
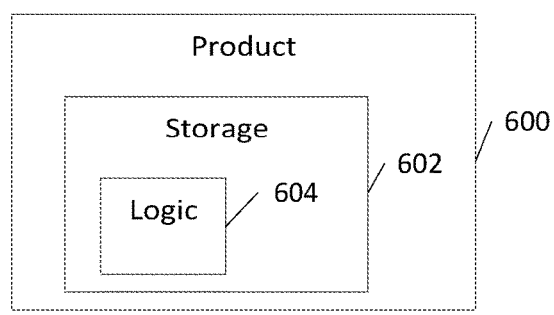
FIG. 6 is a schematic illustration of a product, in accordance with some demonstrative embodiments.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of UE 102 (FIG. 1), node 104 (FIG. 1), AP 106 (FIG. 1), wireless communication unit 110 (FIG. 1), wireless communication unit 130 (FIG. 1) and/or to perform one or more operations of the method of FIG. 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many variations, modifications, substitutions, changes, additions, improvements and equivalents may occur to those skilled in the art. It is, therefore, to be understood that the appended claims are intended to cover all such modifications and changes as fall within the true spirit of the invention.

What is claimed is:

1. An apparatus comprising a memory and a processor configured to cause a user equipment (UE) to:
receive, from an evolved NodeB (eNB) in an evolved universal terrestrial radio access network (E-UTRAN), a signal including wireless local area network (WLAN) information, wherein the WLAN information comprises at least one of information of a WLAN channel utilization or information of a WLAN backhaul; and
determine whether to offload communication from the E-UTRAN to the WLAN through connecting to an access point (AP) of the WLAN, at least in part based on a determination of whether a condition pertaining to the WLAN information occurs, wherein the apparatus is configured to cause the UE to determine to offload communication from the E-UTRAN to the WLAN, at least in part based on a comparison between a value, which is based on a WLAN backhaul load, and a threshold.

2. The apparatus of claim 1, wherein the information of the WLAN backhaul is based on the WLAN backhaul load.

3. The apparatus of claim 1, wherein the WLAN information is based on a WLAN available bandwidth.

4. The apparatus of claim 1 configured to cause the UE to determine to offload communication from the E-UTRAN to the WLAN, at least in part based on a determination that the value, which is based on the WLAN backhaul load, is higher than the threshold.

5. The apparatus of claim 1 configured to cause the UE to receive updated WLAN information from the eNB, and to determine to offload communication from the WLAN to the E-UTRAN through disconnecting from the AP of the WLAN, at least in part based on a determination of whether a condition related to the updated WLAN information occurs.

6. The apparatus of claim 1 configured to cause the UE to determine to offload communication from the WLAN to the E-UTRAN, at least in part based on a determination that the updated WLAN information indicates that a WLAN value, which is based on the WLAN backhaul load, meets a criterion with respect to a WLAN threshold.

7. The apparatus of claim 1 configured to cause the UE to receive the WLAN information from the eNB as part of a Radio Resource Control (RRC) signaling message.

8. The apparatus of claim 1 configured to cause the UE to receive from the eNB cellular load information associated to a load of a cellular network controlled by the eNB.

9. The apparatus of claim 1 comprising a wireless communication radio to receive the WLAN information from the eNB.

10. The apparatus of claim 9 comprising one or more antennas.

11. A product comprising a non-transitory computer readable storage medium encoded with executable instructions, which when executed by at least one processor, cause a user equipment (UE) to:
receive, from an evolved NodeB (eNB) in an evolved universal terrestrial radio access network (E-UTRAN), a signal including wireless local area network (WLAN) information, wherein the WLAN information comprises at least one of information of a WLAN channel utilization or information of a WLAN backhaul; and
determine whether to offload communication from the E-UTRAN to the WLAN through connecting to an access point (AP) of the WLAN, at least in part based on a determination of whether a condition pertaining to the WLAN information occurs, wherein the instructions, when executed, cause the UE to determine to offload communication from the E-UTRAN to the WLAN, at least in part based on a comparison between a value, which is based on a WLAN backhaul load, and a threshold.

12. The product of claim 11, wherein the information of the WLAN backhaul is based on the WLAN backhaul load.

13. The product of claim 11, wherein the WLAN information is based on a WLAN available bandwidth.

14. The product of claim 11, wherein the instructions, when executed, cause the UE to determine to offload communication from the E-UTRAN to the WLAN, at least in part based on a determination that the value, which is based on the WLAN backhaul load, is higher than the threshold.

15. The product of claim 11, wherein the instructions, when executed, cause the UE to receive updated WLAN information from the eNB, and to determine to offload communication from the WLAN to the E-UTRAN through disconnecting from the AP of the WLAN, at least in part based on a determination of whether a condition related to the updated WLAN information occurs.

16. The product of claim 15, wherein the instructions, when executed, cause the UE to determine to offload communication from the WLAN to the E-UTRAN, at least in part based on a determination that the updated WLAN information indicates that a W-LAN value, which is based on the WLAN backhaul load, meets a criterion with respect to a WLAN threshold.

17. The product of claim 11, wherein the instructions, when executed, cause the UE to receive the WLAN information from the eNB as part of a Radio Resource Control (RRC) signaling message.

18. An apparatus comprising a memory and a processor configured to cause an evolved NodeB (eNB) in an evolved universal terrestrial radio access network (E-UTRAN) to:
  transmit to a user equipment (UE) wireless local area network (WLAN) information as part of a first radio resource control (RRC) signaling message, the WLAN information configured to assist the UE in determination whether to offload communication from the E-UTRAN to the WLAN based on a threshold, wherein the WLAN information comprises at least one of information of a WLAN channel utilization or information of a WLAN backhaul; and
  transmit to the UE updated WLAN information as part of a second RRC signaling message, the updated WLAN information comprises at least one of updated information of the WLAN channel utilization or updated information of the WLAN backhaul.

19. The apparatus of claim 18, wherein the information of the WLAN backhaul is based on a WLAN backhaul load.

20. The apparatus of claim 18, wherein the WLAN information is based on a WLAN available bandwidth.

21. The apparatus of claim 18 comprising a wireless communication radio, and one or more antennas.

22. A product comprising a non-transitory computer readable storage medium encoded with executable instructions, which when executed by at least one processor, cause an evolved NodeB (eNB) in an evolved universal terrestrial radio access network (E-UTRAN) to:
  transmit to a user equipment (UE) wireless local area network (WLAN) information as part of a first radio resource control (RRC) signaling message, the WLAN information configured to assist the UE in determination whether to offload communication from the E-UTRAN to the WLAN based on a threshold, wherein the WLAN information comprises at least one of information of a WLAN channel utilization or information of a WLAN backhaul; and
  transmit to the UE updated WLAN information as part of a second RRC signaling message, the updated WLAN information comprises at least one of updated information of the WLAN channel utilization or updated information of the W LAN backhaul.

23. The product of claim 22, wherein the information of the WLAN backhaul is based on a WLAN backhaul load.

* * * * *

UNITED STATES PATENT AND TRADEMARK OFFICE
CERTIFICATE OF CORRECTION

PATENT NO. : 10,397,830 B2
APPLICATION NO. : 15/846581
DATED : August 27, 2019
INVENTOR(S) : Alexander Sirotkin Page 1 of 1

It is certified that error appears in the above-identified patent and that said Letters Patent is hereby corrected as shown below:

In the Claims

In Column 24, Line 4, in Claim 6, delete "of claim 1 configured" and insert -- of claim 5 configured --, therefor.

Signed and Sealed this
Twenty-fourth Day of December, 2019

Andrei Iancu
*Director of the United States Patent and Trademark Office*